United States Patent
Shull et al.

(10) Patent No.: US 7,245,799 B2
(45) Date of Patent: Jul. 17, 2007

(54) OPTICAL FIBER CONNECTORS AND SYSTEMS INCLUDING OPTICAL FIBER CONNECTORS

(75) Inventors: William A. Shull, Aptos, CA (US); James Parsons, Santa Cruz, CA (US)

(73) Assignee: Zygo Corporation, Middlefield, CT (US)

( * ) Notice: Subject to any disclaimer, the term of this patent is extended or adjusted under 35 U.S.C. 154(b) by 224 days.

(21) Appl. No.: 10/997,498

(22) Filed: Nov. 24, 2004

(65) Prior Publication Data

US 2005/0238289 A1   Oct. 27, 2005

Related U.S. Application Data

(60) Provisional application No. 60/525,094, filed on Nov. 25, 2003.

(51) Int. Cl.
*G02B 6/26* (2006.01)
(52) U.S. Cl. .............................. 385/23; 385/25; 385/52
(58) Field of Classification Search ........... 385/20–25, 385/52
See application file for complete search history.

(56) References Cited

U.S. PATENT DOCUMENTS

| | | | | |
|---|---|---|---|---|
| 4,329,017 A | * | 5/1982 | Kapany et al. | 385/22 |
| 4,993,796 A | * | 2/1991 | Kapany et al. | 398/82 |
| 5,083,032 A | | 1/1992 | Suzuki | 250/492.2 |
| 5,204,925 A | * | 4/1993 | Bonanni et al. | 385/89 |
| 5,667,473 A | * | 9/1997 | Finn et al. | 600/104 |
| 5,881,192 A | * | 3/1999 | Chen et al. | 385/72 |
| 6,166,820 A | | 12/2000 | Ghosh et al. | 356/508 |
| 2002/0127050 A1 | | 9/2002 | Andeen et al. | 403/220 |

OTHER PUBLICATIONS

Graf, Mark. "Active Alignment Process Reduces Fiber-Core Offsets." *Laser Focus World* (1996) 1-2.
Untitled Document . http://www.point-source.com/html/theory/fds/home.html (Point Source Web site information), no date avalbile.
PicoFlex "Miniature Singlemode Fiber Delivery System." Point-Source, Jan. 2000.
KineFlex "Kinematic Singlemode Fober Delivery System," Point-Source, Jan. 2000.
Search Report for International Application No. PCT/US04/39627 by Frank Font dated Jul. 26, 2006.

* cited by examiner

*Primary Examiner*—Brian Healy
*Assistant Examiner*—Charlie Peng
(74) *Attorney, Agent, or Firm*—Fish & Richardson P.C.

(57) ABSTRACT

The invention features an apparatus including a first portion defining an optical axis and configured to connect to an optical fiber, a second portion having a reference surface configured to connect with a terminal, and a third portion between the first and second portions. The third portion bends more easily than either the first or second portion to permit adjustable alignment of the optical axis relative to the reference surface.

35 Claims, 10 Drawing Sheets

OPTICAL FIBER CONNECTORS AND SYSTEMS INCLUDING OPTICAL FIBER CONNECTORS

CROSS-REFERENCE TO RELATED APPLICATIONS

Under 35 U.S.C. 119(e), this application claims priority to U.S. Provisional Application Ser. No. 60/525,094 filed Nov. 25, 2003 and entitled "FIBER OPTIC CONNECTOR," the contents of which are incorporated herein by reference.

BACKGROUND

The invention relates to optical fiber connectors and systems including optical fiber connectors.

Optical fiber connectors form a remateable connection between two fibers, generally by physically aligning the cores of the fibers with one another. Alternatively, optical fiber connectors can be used to connect a optical fiber to a light source (e.g., a laser) or a receiver. Many commercially available connectors include four basic components: a ferrule; a body; a cable; and a coupling device.

A ferrule is a long, thin cylinder in which the fiber is mounted. The ferrule is bored through the center at a diameter slightly larger than the diameter of the fiber cladding. The end of the fiber is located at the end of the ferrule. Ferrules are typically made of metal or ceramic, but may also be made from plastic. A ferrule may also be referred to as a snout.

A body or housing holds the ferrule. It is usually constructed of metal or plastic and includes one or more assembled pieces which hold the fiber in place. Bonding and/or crimping is often used to attach strength members and/or cable jackets to the connector body. The ferrule extends past the connector body to slip into the coupling device.

A cable is attached to the connector body. It acts as a point of entry for the fiber. Typically a strain-relief boot is added over the junction between the cable and the connector body, providing extra strength to the junction.

Optical fiber connectors typically use a male-female or a dual female coupling device configurations.

Examples of commercially available optical fiber connectors include SMA 906 connectors (Amphenol Corp.), ST connectors (introduced by AT&T), FC connectors (introduced by NTT), D4 connectors (designed by NEC), HMS-10 (by Diamond, Inc.), and SC connectors (from NTT).

A primary measure of connector performance is insertion loss, usually as tested against an "ideal" reference connector. Typically, when properly connected, insertion loss is between about 0.1 dB and 1 dB.

SUMMARY

In certain aspects, the invention features a optical fiber connector that that repeatably provides low insertion loss (e.g., about 0.3 dB or less) without adjustment beyond an initial alignment procedure. The connector includes a focusing element (e.g., a lens) fixed relative to the tip of the fiber. Where light is input into the fiber, the lens focuses collimated light onto the fiber core. When light exits the fiber, the lens collimates the divergent rays from the fiber. The connector also includes a deformable portion that couples the fiber and lens to a fastener which attaches to an opposing terminal (e.g., a light source, a receiver, or another fiber). The angular orientation of the fastener relative to the fiber axis is adjusted during the alignment procedure by adjusting the deformable portion. The orientation of the fastener is adjusted to provide collimated light to the lens.

In some cases, angular tolerances of an input beam directed through the lens into the fiber of less than 50 microradians and positional tolerances of less than about 100 microns is provided to achieve insertion losses of less than about 0.3 dB (e.g., less than about 0.2 dB, 0.1 dB).

In some embodiments, components of the connector assembly are axisymetric, and are threaded together and locked tight prior to a final angular alignment step of the entire assembly. After the final alignment step, the connector can be used to connect and reconnect with a source, receiver, or other fiber.

In general, in one aspect, the invention features an apparatus including a first portion defining an optical axis and configured to connect to an optical fiber, a second portion having a reference surface configured to connect with a terminal, and a third portion between the first and second portions. The third portion bends more easily than either the first or second portion to permit adjustable alignment of the optical axis relative to the reference surface.

In general, in another aspect, the invention features an apparatus including a first portion defining an optical axis and configured to connect to an optical fiber, a second portion having a reference surface configured to connect with a terminal, and a third portion between the first and second portions. The third portion deforms to a greater extent than either of the first or second portions in response to an applied stress to permit adjustable alignment of the optical axis relative to the reference surface.

In general, in another aspect, the invention features an apparatus including a first portion defining an optical axis and configured to connect to an optical fiber, a second portion having a reference surface configured to connect with a terminal, and a third portion between the first and second portions. The third portion includes a plastically deformable neck region to permit adjustable alignment of the optical axis relative to the reference surface.

In general, in another aspect, the invention features an apparatus including a first portion defining an optical axis and configured to connect to an optical fiber, a second portion having a reference surface configured to connect with a terminal, and a third portion between the first and second portions. The third portion includes walls that define a light passage between the first and second portions. The walls have a thickness that varies to allow the third portion to deform to permit adjustable alignment of the optical axis relative to the reference surface.

In general, in another aspect, the invention features an apparatus including a first portion defining an optical axis and configured to connect to an optical fiber, a second portion having a reference surface configured to connect with a terminal, and a third portion between the first and second portions. The third portion includes walls that define a light passage between the first and second portions. The walls have a region thinner than adjacent regions to allow the third portion to deform to permit adjustable alignment of the optical axis relative to the reference surface.

In general, in another aspect, the invention features a system including a laser cavity, and an output terminal including an apparatus as described above, for coupling light from the laser cavity to an optical fiber.

In general, in another aspect, the invention features an interferometry system including a laser system that provides at least one source beam, a delivery system that collects the source beam from the laser system over optical fiber using at least one apparatus as described above, and provides an input beam, and an interferometer which during operation directs the input beam along different paths and provides an interference signal based on the input beam. The interference signal is indicative of changes in an optical path difference between the different paths.

In general, in another aspect, the invention features a lithography system for use in fabricating integrated circuits on a wafer. The system includes a stage for supporting the wafer, an illumination system for imaging spatially patterned radiation onto the wafer, a positioning system for adjusting the position of the stage relative to the imaged radiation, and the interferometry system described above for monitoring the position of the wafer relative to the imaged radiation.

In general, in another aspect, the invention features a lithography system for use in fabricating integrated circuits on a wafer. The system includes a stage for supporting the wafer, and an illumination system including a radiation source, a mask, a positioning system, a lens assembly, and the interferometry system described above. During operation the source directs radiation through the mask to produce spatially patterned radiation, the positioning system adjusts the position of the mask relative to the radiation from the source, the lens assembly images the spatially patterned radiation onto the wafer, and the interferometry system monitors the position of the mask relative to the radiation from the source.

In general, in another aspect, the invention features a beam writing system for use in fabricating a lithography mask. The beam writing system includes a source providing a write beam to pattern a substrate, a stage supporting the substrate, a beam directing assembly for delivering the write beam to the substrate, a positioning system for positioning the stage and beam directing assembly relative one another, and the interferometry system described above for monitoring the position of the stage relative to the beam directing assembly.

Embodiments of the assemblies can include one or more of the following features.

The third portion can be configured to bend to adjust the alignment of the optical axis relative to the reference surface without blocking the light passage between the first and second portions. The third portion can be configured to bend over a range of about 10 milliradians or less without fracturing to adjust the alignment of the optical axis relative to the reference surface. The third portion can be configured so that the alignment of the optical axis relative to the reference surface can be adjusted by about 200 microradians or more. The third portion can be configured so that the alignment of the optical axis relative to the reference surface can be adjusted by about one milliradian or more. The third portion can be configured so that the alignment of the optical axis relative to the reference surface can be adjusted by an amount that reduces insertion loss by about 0.1 dB or more. The third portion can be configured so that the alignment of the optical axis relative to the reference surface can be adjusted by an amount that reduces insertion loss by about 0.5 dB or more. The third portion can be bent from its initially manufactured shape. The third portion can have a yield point of about 80,000 psi or lower (e.g., about 40,000 psi or lower).

The apparatus can further include a focusing element housed in the first portion, the focusing element being configured to couple light between the optical fiber and the terminal. The focusing element can include a lens.

The first portion can be configured to move over a housing configured to house a ferrule surrounding an end of the optical fiber. The first portion and the housing can consist essentially of materials that have similar thermo-mechanical properties to the focusing element.

The reference can be flat to within about 0.000006 inches or less across its diameter.

The second portion can include a polarization keyway. The second portion can include a centering ball.

The terminal can be coupled to a light source. The terminal can be coupled to an optical receiver. The terminal can be coupled to a second optical fiber.

The plastically deformable portion can include one or more metals.

The third portion can consist essentially of stainless steel. The third portion can be welded to the second portion. The third portion can be threaded over the second portion. The third portion can include a cylindrical region having walls that are thinnest in a center portion of the cylindrical region. The third portion can consist essentially of one or more metals. The third portion can be annealed to soften the thinnest portion of the cylindrical region.

The thinnest portion of the cylindrical region can be soft enough to be plastically deformed beyond its yield point to allow about 200 microradians or more (e.g., about one milliradian or more) of angular alignment variation of the optical axis relative to the reference surface.

In the systems, the laser cavity can be configured to operate at a visible wavelength.

Embodiments of the invention can include one or more of the following advantages.

Embodiments can reduce or eliminate the stringent requirement of aligning a fiber, focusing lens and mechanical datum when a connector assembly is built directly onto a bare fiber. Once a connector assembly is attached and aligned to the end of a fiber, the fiber may be connected to other fibers without further alignment. Alignment of the connector assembly can be performed by adjusting a single degree of freedom of the connector assembly after the connector assembly has been completely fabricated, making individual part tolerances less critical. Since angular tolerances are often more critical than positional tolerances, sufficient concentricity of each part (fiber connector, focusing lens and connector face with deformable mount) can be achieved through the machining process thereby reducing cost and complexity.

Commercially-available connector technology can be used to terminate the fiber. The connector can be attached to the fiber by an outside vendor and is a well-known process. A commercially available aspheric lens can be used to focus the light into the fiber.

The adjustable portion of the connector assembly can be a simple, passive component (e.g., a simple plastically deformable mount) to achieve angular adjustment of the fiber/lens pair to a mechanical datum.

The beam waist of the connector assembly may be adjusted as part of the focusing process. Subassemblies of the connector assembly (e.g., fiber FC connector, focusing lens assembly and connector face with deformable mount) can be threaded together and locked in place over the life of the connector. The overall cost of the connector/collimator assembly can be low due to simple components and standard purchased parts. The connector/collimator can employ simple, low tolerance machine parts whose tolerances are corrected by the deformable angular mount. Component parts of the connector assembly may be replaced after assembly if one or more parts are found to be defective.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety. In case of conflict, the present specification, including definitions, will control.

The details of one or more embodiments of the invention are set forth in the accompanying drawings and the description below. Other features and advantages of the invention will be apparent from the description and drawings, and from the claims.

DETAILED DESCRIPTION

Various types of optical fiber connectors have been developed for communications systems that use optical fiber for carrying light potentially over long distances, such as telecommunication systems. These systems typically use light whose wavelength is near a low-loss region of the absorption spectrum of glass fiber (e.g., around 1.3 microns or around 1.6 microns). The optical fiber connectors, even if used for coupling light into or out of a short span of fiber, are typically designed for low insertion loss coupling of light in the near infrared spectrum. Other systems, including interferometry systems, use light having a shorter wavelength including light in the visible spectrum.

For example, an interferometry system may use a Helium Neon (HeNe) laser providing light with a wavelength around 633 nm. This shorter wavelength places tighter constraints on alignment of a beam (e.g., by a factor of about 2-3) for low insertion loss coupling into an optical fiber or other optical terminal. Furthermore, systems that use polarized light, such as an interferometry system, may have even tighter constraints (e.g., by a factor of about 10 or more) for low insertion loss coupling into a polarization maintaining fiber. Therefore, in certain applications, it is useful to provide a optical fiber connector that is able to be calibrated to a high degree of accuracy for repeated low insertion loss coupling into or out of an optical fiber (including between two optical fibers). Such connectors can be useful for providing increased accuracy for coupling light at a variety of wavelengths (e.g., uv, visible, infrared) for a variety of systems (e.g., interferometry systems, communication systems, imaging systems, etc.).

Figure 1A:
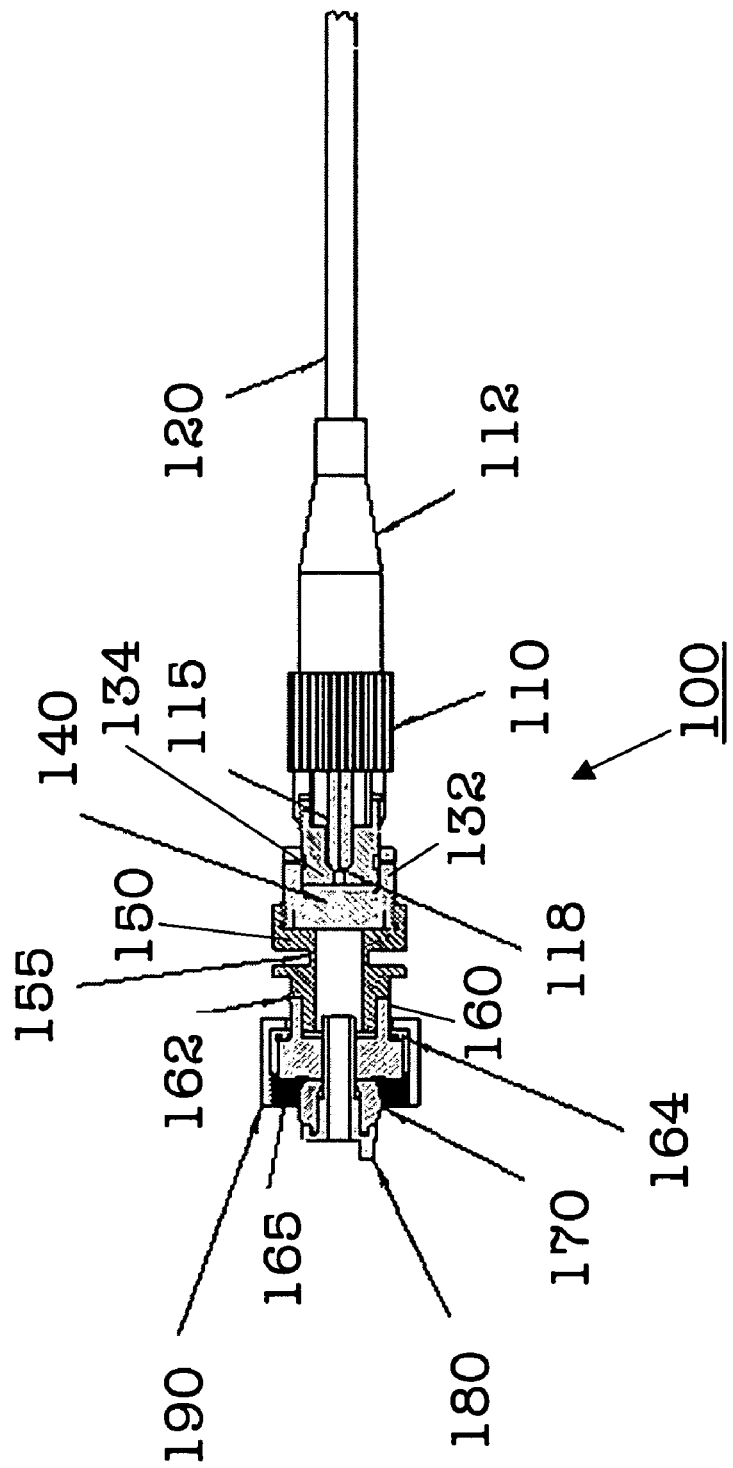
FIG. 1A is a diagram showing a cross-sectional view of an embodiment of a optical fiber connector assembly. Parts shown are substantially cylindrically symmetric.

Referring to FIG. 1A, in some embodiments, an optical fiber connector assembly 100 includes a standard FC fiber connector 110 attached to a fiber inside fiber jacket 120. FC fiber connectors are commercially available from vendors such as Thorlabs (Newton, N.J.). FC fiber connector 110 includes a boot 112 and a ceramic snout 115. The fiber terminates at a tip 118 of ceramic snout 115, polished at an angle relative to the fiber axis. Alternatively, other types of custom or standard fiber connectors can be used including, for example, ST or SMA connectors.

FC fiber connector 110 attaches to a focusing lens assembly, which includes two concentric parts. A first part 132 carries a focusing lens 140 and moves r a second part 134 that is screwed onto fiber connector 110 and houses ceramic snout 115. First part 132 can be adjusted relative to second part 134 so that lens 140 is positioned to focus collimated light onto tip 118 (or to collimate light from tip 118). Here collimated light refers to light propagating substantially parallel to the optical axis of the lens. Lens 140 is bonded to part 132 with a suitable epoxy such as Epotek 353ND or 302ND. Focusing can be accomplished, for example, by threading an inside surface of part 132 and an outside surface of part 134 (e.g., with an 80 pitch thread) and screwing part 132 relative to part 134 to attain the desired focus. Alternatively, focusing can be accomplished, by sliding part 132 relative to part 134, and once the desired focus is attained, locking the two parts together with adhesive.

Typical glasses used for focusing lens 140 are Hoya TAC4, Hoya FDS9 or Corning CO550. The lens shape can be aspheric to reduce aberrations due to the tight focus necessary to match the numerical aperture of the optical fiber. In certain embodiments, lens 140 includes a graded index material. The index profile of the graded index material can be selected to compensate for refraction experienced by light exiting the fiber due to the angled surface.

In some embodiments, the parts 132 and 134 can be made from materials that also match the thermal coefficient of expansion (TCE) of the focusing lens 140. For example, TAC4 glass matches the TCE of 4750 alloy from Alegany Ludlum or 49 Carpenter alloy. FDS9 glass matches the TCE of 300 series stainless steel.

Connector assembly 100 also includes a deformable part 150 and a coupling part 160. Deformable part 150 includes a threaded portion which screws onto a corresponding threaded portion of part 132. Deformable part 150 also includes a deformable region 155 which has thinner walls than the other regions of deformable part 150.

Figure 1B:
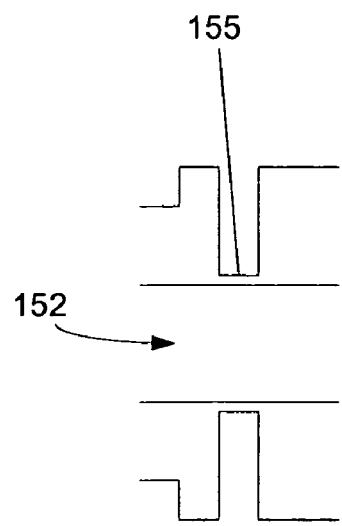
FIG. 1B is an expanded view of a deformable part of the connector assembly in FIG. 1A.

FIG. 1B shows an expanded cross-sectional view of deformable region 155 whose cylindrical walls define a light passage 152 between part 132 and coupling part 160. The walls of deformable region 155 have an inner diameter (ID) the same as that of neighboring regions and an outer diameter (OD) smaller than that of neighboring regions (e.g., smaller by a factor of about 2 or more, or by a factor of about 10 or more, depending on the properties of the material and the desired deformability of region 155). This neck in the deformable part 150 enables part 150 to bend more easily than either part 132 or coupling part 160 to permit adjustable alignment of an optical axis defined by part 132 (e.g., the optical axis of lens 140) relative to a reference surface of coupling part 160.

Figure 1C:
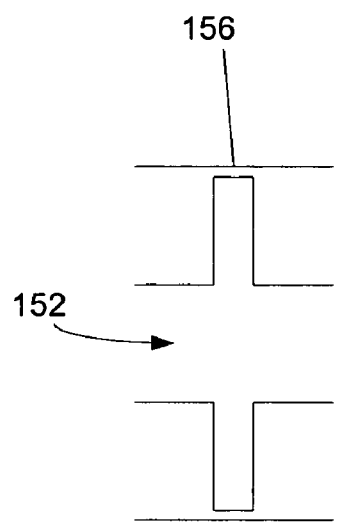
FIGS. 1C-1E are expanded views of alternative configurations for the deformable part.
Figure 1D:
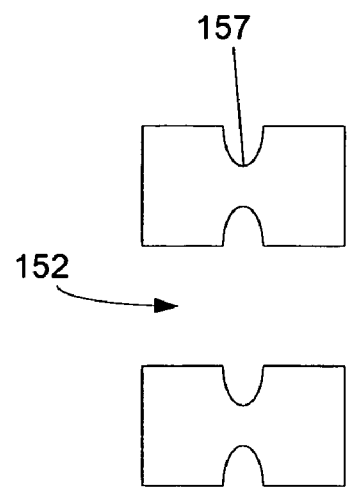
Figure 1E:
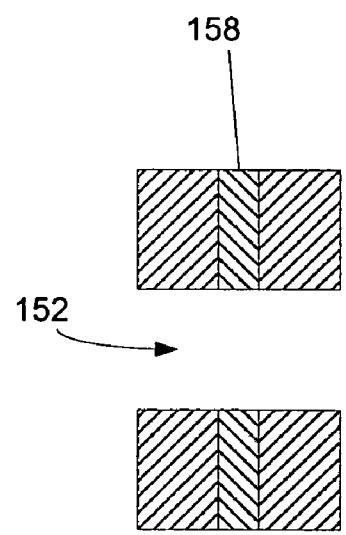

Alternatively, other configurations of the deformable region 155 can also enable part 150 to bend more easily than either part 132 or coupling part 160 to permit the adjustable alignment. For example, FIG. 1C shows a deformable region 156 whose walls have an OD the same as that of neighboring regions and an ID smaller than that of neighboring regions. FIG. ID shows a deformable region 157 that has curved walls that are thinner than the walls of neighboring regions. FIG. 1E shows a deformable region 158 whose walls have the same thickness as the walls of neighboring regions, but is made of a different material that bends more easily (e.g., has a lower yield point, as described in more detail below).

Deformable region 155 is "plastically deformable," which means that its shape can be permanently changed without fracture upon the application of sustained stress beyond the elastic limit. For example, some materials such as ductile metals, after being "elastically deformed" due to an applied stress, will return to their original shape and dimensions provided the stress is below a characteristic limit for the material. This limit is called the "elastic limit" (or equivalently the "yield point"). Beyond this stress level, plastic deformation occurs, in which the material bends and does not return to its original shape. With continued stress, after a certain amount of plastic deformation, a material may fracture (e.g., crack or break). The elastic limit of a given material depends on properties such as hardness. For example, the elastic limit of steel can vary by as much as an order of magnitude between the softest steel and the hardest steel.

By configuring deformable region 155 to have a lower yield point than neighboring regions (e.g., by varying the thickness of its walls and/or its material composition) deformable part 150 will deform (at deformable region 155) to a greater extent than either part 132 or coupling part 160 in response to an applied stress to permit the adjustable alignment. The amount of applied stress needed depends on the resulting yield point of the deformable region 155. In some embodiments, the yield point of deformable region 155 is about 100,000 psi or lower (e.g., about 80,000 psi or lower, about 60,000 or lower, about 50,000 psi or lower, about 40,000 psi or lower, about 30,000 psi or lower, about 20,000 psi or lower). In certain embodiments, the yield point can be sufficiently large so that the region cannot be easily deformed by hand or during day-to-day use. The yield point of deformable region 155 can be about 500 psi or higher (e.g., about 1,000 psi or higher, about 2,000 psi or higher, about 5,000 psi or higher, about 7,000 psi or higher, about 10,000 psi or higher).

Coupling part 160 slips over a narrowed portion of deformable part 150. A weld 162 secures coupling part 160 to deformable part 150. Coupling part 160 includes a face 165 which is manufactured to a high degree of accuracy. For example, the face can be ground flat to about 0.000006 inches across its diameter and then lapped to one fringe. Face 165 functions as a "mechanical datum" (or reference surface) to which a corresponding terminal can be registered.

Coupling part 160 and deformable part 150 can be made from different materials. For example, coupling part 160 can be made from 440C stainless steel which is martensitic and can be hardened to Rockwell 58 after machining. Deformable part 150 can be made from a material which allows deformable region 155 to be fully annealed prior to welding to the connector face, such as 300 series stainless steel or alloys 4750 or 49. A typical annealing schedule for 300 series stainless and 4750 alloy is 1000 degrees centigrade for 2 minutes. The annealing process softens the material allowing the thin deformable region 155 to be deformed beyond its yield point thereby allowing a small amount of angular adjustment to take place (e.g., about 10 milliradians or less, about five millradians or less, about two milliradians or less, about one milliradian or less, about 500 microradians or less, about 200 microradians or less, such as 100 microradians or less).

Using two separate parts to provide deformable part 150 and coupling part 160 allows a captive nut 190 and spring washers 164 to be installed around the small diameter prior to the weld.

Connector assembly 100 also includes a centering ball 170 and a polarization keyway 180. Keyway 180 is used in embodiments where cylindrical symmetry of the fiber and/or signal is broken, such as when using polarization-maintaining fiber, where the keyway is used to align the fast or slow axis of the fiber relative to the connector assembly.

Centering ball 170 fits into a precision ID of coupling part 160 allowing an opposing connector to tilt and find registration against flat connector face 165. The keyway and centering ball are affixed to coupling part 160 using an appropriate epoxy adhesive system such as Epotek 353ND.

Once all the parts of connector assembly 100 are assembled, the threads can be locked down tight and adhesive may be used to insure that treads do not loosen.

After assembly, an angular adjustment may be made to align connector face 165 relative to the fiber and focusing lens. Alignment ensures that light (e.g., collimated light) entering a terminal coupled to coupling part 160 is aligned with respect to lens 140 such that the light focuses onto the core of the fiber. Conversely, where connector assembly 100 serves as an output terminal, alignment ensures that light exiting the connector is properly aligned with the terminal coupled to coupling part 160.

Figure 1F:
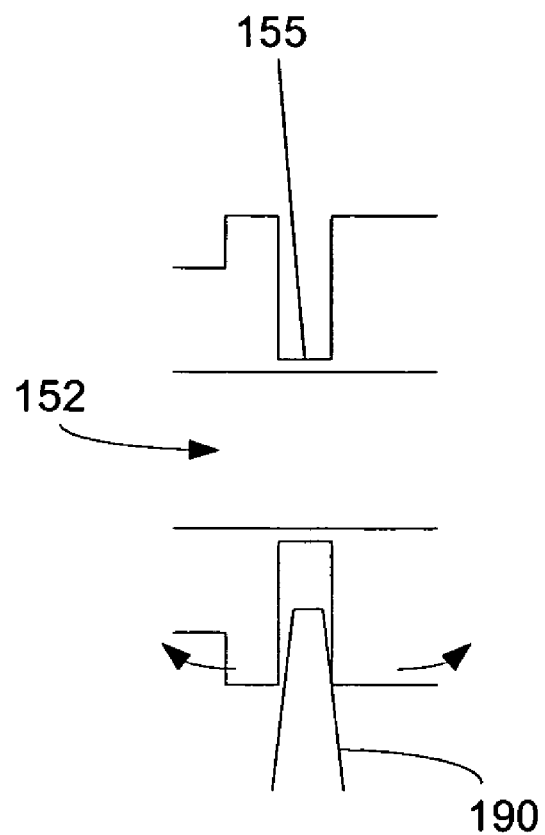
FIG. 1F is an expanded view of the deformable part being aligned.

Referring to FIG. 1F, angular alignment of connector assembly 100 is performed by inserting a tool 190 into the groove at deformable region 155 and prying the two sides of the groove apart to bend deformable region 155. There may be a small amount of spring back to the material of deformable part 150, but an operator can accommodate for this by adjusting deformable part 150 beyond the needed deformation. The tip of tool 190 can be a tapered edge shaped like a screwdriver that is 50 thousandths-60 thousandths of an inch thick and hardened to Rockwell 58c. Alternatively, an operator can bend deformable region 155 by applying the necessary force to portions of deformable part 150 away from deformable region 155 using an appropriate tool.

Angular alignment of connector assembly 100 may be measured by calibrating the angle between a reference laser beam centerline and a reference surface (e.g., connector face 165) using position detectors or apertures at known distances from connector assembly 100. Alternatively, a laser source that has known good alignment of its beam relative to the reference surface may also be used to calibrate the angular alignment of connector assembly 100. In some embodiments, connector assembly 100 provides angular alignment of about 200 microradians or more is provided. In other embodiments, connector assembly 100 provides angular alignment of about one milliradian or more. In some embodiments, connector assembly 100 can be aligned by bending deformable region 155 by about 100 milliradians or less (e.g., about 50 milliradians or less, about 20 milliradians or less, about 10 milliradians or less, about five milliradians or less).

The amount of angular adjustment that takes place can also be calibrated in terms of the relative reduction of insertion loss that results. In some embodiments, connector assembly 100 provides low insertion loss coupling of light from an initially uncoupled state. Alternatively, or additionally, in certain embodiments, connector assembly 100 provides a fine-tuning adjustment for reducing the insertion loss of light coupled into or out of an optical fiber. For example, in some embodiments, adjusted connector assembly 100 enables a reduction of insertion loss of about 0.1 dB or more relative to the unadjusted connector. In some embodiments, the reduction of insertion loss is as about 0.3 dB or more (e.g., about 0.5 dB or more, about 0.8 dB or more, about 1 dB or more, about 2 dB or more).

After assembly and angular alignment (e.g., by a manufacturer), connector assembly 100 can be repeatedly mated and unmated (e.g., to a terminal at coupling part 160 and/or to a connectorized optical fiber at part 134) without necessarily needing to be realigned as long as any stress applied to deformable region 155 is below its yield point.

Figure 2:
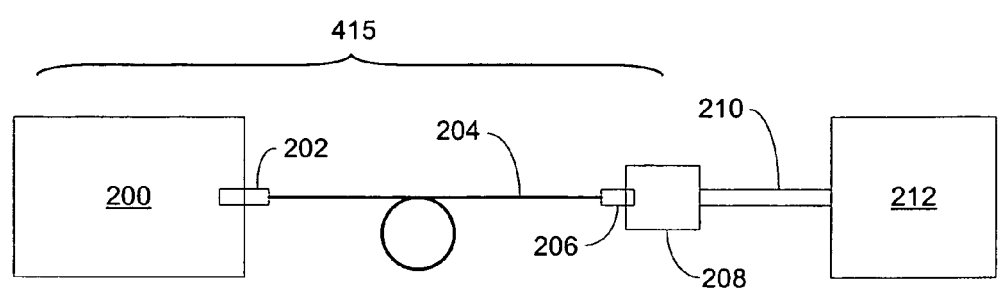
FIG. 2 is a schematic diagram of an optical source incorporating a connector assembly for delivering light to an interferometer.

Connector assembly 100 can be incorporated into any of a variety of optical devices to provide low insertion loss, stable, repeatable optical fiber connections. FIG. 2 shows an optical source 415 for delivering stable collimated light to an interferometer 212. Optical source 415 includes a laser system 200. Laser system 200 has an output terminal that includes a connector assembly 202 to mate with a first end of a connectorized optical fiber 204 (e.g., an optical fiber having FC connectors at its ends). The second end of optical fiber 204 mates with a connector assembly 206 at the input terminal of a delivery module 208. Delivery module 208 provides a collimated beam 210 to an interferometer 212. Both connector assemblies 202 and 206 have been aligned for use with optical source 415, as described above with reference to connector assembly 100. Alternatively, connector assembly 202 can be aligned as described above, and connector assembly 206 can be a standard fiber connector that is not adjustable for receiving light from optical fiber 204.

In some applications, such as heterodyne interferometry, it is useful to provide an output beam that includes two phase-coherent orthogonally polarized components that have different frequencies. The different frequencies can be produced in delivery module 208, for example, by Zeeman splitting or acousto-optical modulation.

Connector assemblies 202 and 206 can enable greater flexibility in placement of laser system 200 relative to interferometer 212. Laser system 200 can be located in a convenient location and light can be coupled from the laser system 200 over an optical fiber to a compact delivery device (such as delivery module 208). This can be useful in systems such as distance measuring interferometry systems in which one or more interferometers are located near a measurement object. For example, it may be inconvenient to route a beam in free space to the desired locations near the measurement object. Furthermore, connector assemblies 202 and 206 provide a rigid mechanical structure for stable pointing accuracy of the beam over the path from laser system 200 to interferometer 212, while still allowing adjustment of fiber coupling to reduce insertion loss. For example, beam pointing stability can achieved to within about 5 microradians using connector assemblies 202 and 206. Such input beam stabilization is particularly useful to reduce potential errors in measurements of a distance measuring interferometry system.

Figure 3:
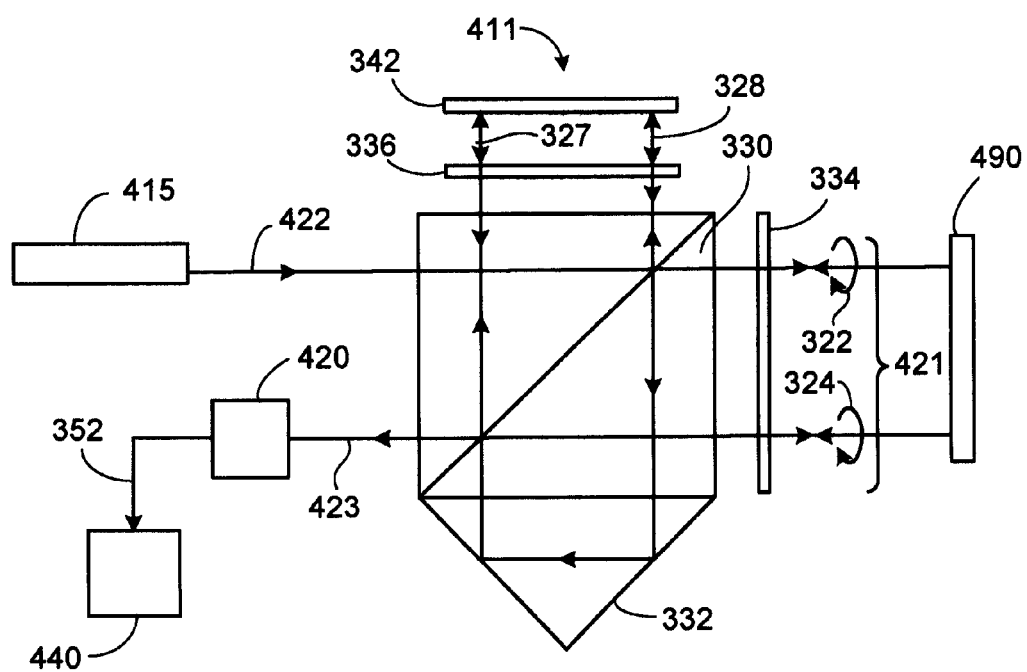
FIG. 3 is a schematic diagram of a portion of a distance measuring interferometry system including a high-stability plane mirror interferometer (HSPMI).

Now referring to FIG. 3, an exemplary distance measuring interferometry system includes a high stability plane mirror interferometer (HSPMI) 411. The HSPMI 411 includes a polarization beam-splitter 330, a retroreflector 332, quarter wave phase retardation plates 334 and 336, and a plane mirror reference object 342. Input beam 422 is a two-component beam provided by optical source 415. HSPMI 411 splits input beam 422 into two components. One component, shown as first and second pass measurement beams 322 and 324, reflects from measurement object 490 twice before exiting HSPMI 411. The other component, shown by first and second pass reference beams 328 and 327, reflect from reference mirror 342 twice before exiting HSPMI 411. The exiting beam components overlap and form output beam 423.

An electrical interference signal 352 is generated by the detection of output beam 423 in detector 420. Detector 420 includes a polarizer to mix the reference and measurement beam components of output beam 423 with respect to polarization. Electrical interference signal 352 contains a heterodyne interference signal from which an estimate of the position of the measurement object 490 can be obtained.

In further embodiments, the interferometry system may be different than that shown in FIG. 3. In particular, the input beam stabilization technique is applicable to other types of interferometers as well. For example, the electrical interference signal 352 may be produced by an interferometry system that may include any of single and/or multiple pass interferometers, passive interferometers, dynamic interferometers, and dispersion interferometers. Furthermore, the interferometry system may monitor one or more degrees of freedom, each of which may produce a corresponding electrical interference signal. Furthermore, the degree(s) of freedom monitored by the interferometry system may include any of changes in distance to a measurement object, changes in relative distance between two measurement objects, changes in the angular orientation of a measurement object, and changes in the direction of the input beam.

Examples of dynamic interferometers are described in U.S. patent application Ser. No. 10/226,591 filed Aug. 23, 2002 and entitled "DYNAMIC INTERFEROMETER CONTROLLING DIRECTION OF INPUT BEAM" by Henry A. Hill. Examples of passive zero shear interferometers are described in U.S. patent application Ser. No. 10/207,314, entitled "PASSIVE ZERO SHEAR INTERFEROMETERS," filed Jul. 29, 2002, by Henry A. Hill. Examples of angular displacement interferometers are described in: U.S. patent application Ser. No. 10/226,591 entitled "DYNAMIC INTERFEROMETER CONTROLLING DIRECTION OF INPUT BEAM," filed Aug. 23, 2002; U.S. Provisional Application 60/314,345 filed Aug. 22, 2001 and entitled "PASSIVE ZERO SHEAR INTERFEROMETERS USING ANGLE SENSITIVE BEAM-SPLITTERS," both by Henry A. Hill, and U.S. patent application Ser. No. 10/272,034 entitled "INTERFEROMETERS FOR MEASURING CHANGES IN OPTICAL BEAM DIRECTION" and filed Oct. 15, 2002 by Henry A. Hill and Justin Kreuzer. Alternatively, or additionally, interferometry systems may include one or more differential angular displacement interferometers, examples of which are also described in U.S. patent application Ser. No. 10/272,034. Examples of interferometry systems for measuring more than one degree of freedom and for reducing beam shear are described in U.S. patent application Ser. No. 10/352,616 filed Jan. 28, 2003 and entitled "MULTIPLE-PASS INTERFEROMETRY" by Henry A. Hill and U.S. patent application Ser. No. 10/351,708 filed Jan. 27, 2003 and entitled "MULTI-AXIS INTERFEROMETER" by Henry A. Hill. Other forms of multiple pass interferometers are described in an article entitled "Differential interferometer arrangements for distance and angle measurements: Principles, advantages and applications" by C. Zanoni, VDI Berichte Nr. 749, 93-106 (1989). Examples of two-wavelength dispersion interferometers are described in U.S. Pat. No. 6,219,144 B1 entitled "APPARATUS AND METHOD FOR MEASURING THE REFRACTIVE INDEX AND OPTICAL PATH LENGTH EFFECTS OF AIR USING MULTIPLE-PASS INTERFEROMETRY" by Henry A. Hill, Peter de Groot, and Frank C. Demarest and U.S. Pat. No. 6,327,039 B1 by Peter de Groot, Henry A. Hill, and Frank C. Demarest.

The interferometry systems described herein can provide highly accurate measurements. Such systems can be especially useful in lithography applications used in fabricating large scale integrated circuits such as computer chips and the like. Lithography is the key technology driver for the semiconductor manufacturing industry. Overlay improvement is one of the five most difficult challenges down to and below 100 nm line widths (design rules), see, for example, the *Semiconductor Industry Roadmap*, p. 82 (1997).

Overlay depends directly on the performance, i.e., accuracy and precision, of the distance measuring interferometers used to position the wafer and reticle (or mask) stages. Since a lithography tool may produce $50-100M/year of product, the economic value from improved performance distance measuring interferometers is substantial. Each 1% increase in yield of the lithography tool results in approximately $1 M/year economic benefit to the integrated circuit manufacturer and substantial competitive advantage to the lithography tool vendor.

The function of a lithography tool is to direct spatially patterned radiation onto a photoresist-coated wafer. The process involves determining which location of the wafer is to receive the radiation (alignment) and applying the radiation to the photoresist at that location (exposure).

To properly position the wafer, the wafer includes alignment marks on the wafer that can be measured by dedicated sensors. The measured positions of the alignment marks define the location of the wafer within the tool. This information, along with a specification of the desired patterning of the wafer surface, guides the alignment of the wafer relative to the spatially patterned radiation. Based on such information, a translatable stage supporting the photoresist-coated wafer moves the wafer such that the radiation will expose the correct location of the wafer.

During exposure, a radiation source illuminates a patterned reticle, which scatters the radiation to produce the spatially patterned radiation. The reticle is also referred to as a mask, and these terms are used interchangeably below. In the case of reduction lithography, a reduction lens collects the scattered radiation and forms a reduced image of the reticle pattern. Alternatively, in the case of proximity printing, the scattered radiation propagates a small distance (typically on the order of microns) before contacting the wafer to produce a 1:1 image of the reticle pattern. The radiation initiates photo-chemical processes in the resist that convert the radiation pattern into a latent image within the resist.

Interferometry systems are important components of the positioning mechanisms that control the position of the wafer and reticle, and register the reticle image on the wafer. If such interferometry systems include the input beam stabilization technique described above, the placement and/or configuration of the light source can be readily changed without comprising the accuracy of the system and/or requiring time consuming realignment procedures.

In general, the lithography system, also referred to as an exposure system, typically includes an illumination system and a wafer positioning system. The illumination system includes a radiation source for providing radiation such as ultraviolet, visible, x-ray, electron, or ion radiation, and a reticle or mask for imparting the pattern to the radiation, thereby generating the spatially patterned radiation. In addition, for the case of reduction lithography, the illumination system can include a lens assembly for imaging the spatially patterned radiation onto the wafer. The imaged radiation exposes resist coated onto the wafer. The illumination system also includes a mask stage for supporting the mask and a positioning system for adjusting the position of the mask stage relative to the radiation directed through the mask. The wafer positioning system includes a wafer stage for supporting the wafer and a positioning system for adjusting the position of the wafer stage relative to the imaged radiation. Fabrication of integrated circuits can include multiple exposing steps. For a general reference on lithography, see, for example, J. R. Sheats and B. W. Smith, in *Microlithography: Science and Technology* (Marcel Dekker, Inc., New York, 1998), the contents of which is incorporated herein by reference.

Interferometry systems described above can be used to precisely measure the positions of each of the wafer stage and mask stage relative to other components of the exposure system, such as the lens assembly, radiation source, or support structure. In such cases, the interferometry system can be attached to a stationary structure and the measurement object attached to a movable element such as one of the mask and wafer stages. Alternatively, the situation can be reversed, with the interferometry system attached to a movable object and the measurement object attached to a stationary object.

More generally, such interferometry systems can be used to measure the position of any one component of the exposure system relative to any other component of the exposure system, in which the interferometry system is attached to, or supported by, one of the components and the measurement object is attached, or is supported by the other of the components.

Figure 4:
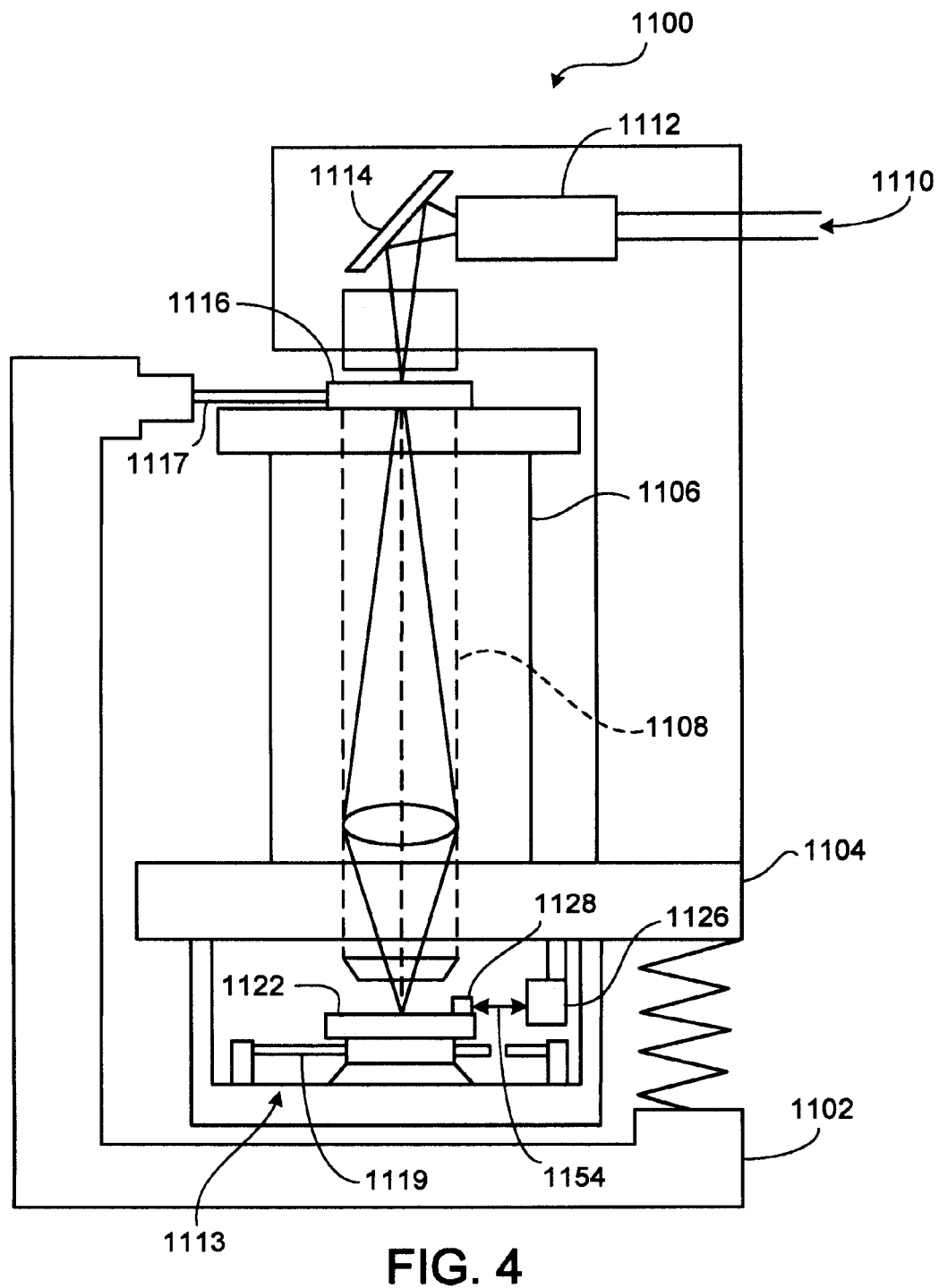
FIG. 4 is a schematic diagram of an embodiment of a lithography tool that includes a distance measuring interferometry system.

An example of a lithography scanner 1100 using an interferometry system 1126 is shown in FIG. 4. The interferometry system is used to precisely measure the position of a wafer (not shown) within an exposure system. Here, stage 1122 is used to position and support the wafer relative to an exposure station. Scanner 1100 includes a frame 1102, which carries other support structures and various components carried on those structures. An exposure base 1104 has mounted on top of it a lens housing 1106 atop of which is mounted a reticle or mask stage 1116, which is used to support a reticle or mask. A positioning system for positioning the mask relative to the exposure station is indicated schematically by element 1117. Positioning system 1117 can include, e.g., piezoelectric transducer elements and corresponding control electronics. Although, it is not included in this described embodiment, one or more of the interferometry systems described above can also be used to precisely measure the position of the mask stage as well as other moveable elements whose position must be accurately monitored in processes for fabricating lithographic structures (see supra Sheats and Smith *Microlithography: Science and Technology*).

Suspended below exposure base 1104 is a support base 1113 that carries wafer stage 1122. Stage 1122 includes a plane mirror 1128 for reflecting a measurement beam 1154 directed to the stage by interferometry system 1126. A positioning system for positioning stage 1122 relative to interferometry system 1126 is indicated schematically by element 1119. Positioning system 1119 can include, e.g., piezoelectric transducer elements and corresponding control electronics. The measurement beam reflects back to the interferometry system, which is mounted on exposure base 1104. The interferometry system can be any of the embodiments described previously.

During operation, a radiation beam 1110, e.g., an ultraviolet (UV) beam from a UV laser (not shown), passes through a beam shaping optics assembly 1112 and travels downward after reflecting from mirror 1114. Thereafter, the radiation beam passes through a mask (not shown) carried by mask stage 1116. The mask (not shown) is imaged onto a wafer (not shown) on wafer stage 1122 via a lens assembly 1108 carried in a lens housing 1106. Base 1104 and the various components supported by it are isolated from environmental vibrations by a damping system depicted by spring 1120.

In other embodiments of the lithographic scanner, one or more of the interferometry systems described previously can be used to measure distance along multiple axes and angles associated for example with, but not limited to, the wafer and reticle (or mask) stages. Also, rather than a UV laser beam, other beams can be used to expose the wafer including, e.g., x-ray beams, electron beams, ion beams, and visible optical beams.

In some embodiments, the lithographic scanner can include what is known in the art as a column reference. In such embodiments, the interferometry system 1126 directs the reference beam (not shown) along an external reference path that contacts a reference mirror (not shown) mounted on some structure that directs the radiation beam, e.g., lens housing 1106. The reference mirror reflects the reference beam back to the interferometry system. The interference signal produce by interferometry system 1126 when combining measurement beam 1154 reflected from stage 1122 and the reference beam reflected from a reference mirror mounted on the lens housing 1106 indicates changes in the position of the stage relative to the radiation beam. Furthermore, in other embodiments the interferometry system 1126 can be positioned to measure changes in the position of reticle (or mask) stage 1116 or other movable components of the scanner system. Finally, the interferometry systems can be used in a similar fashion with lithography systems involving steppers, in addition to, or rather than, scanners.

Figure 5A:
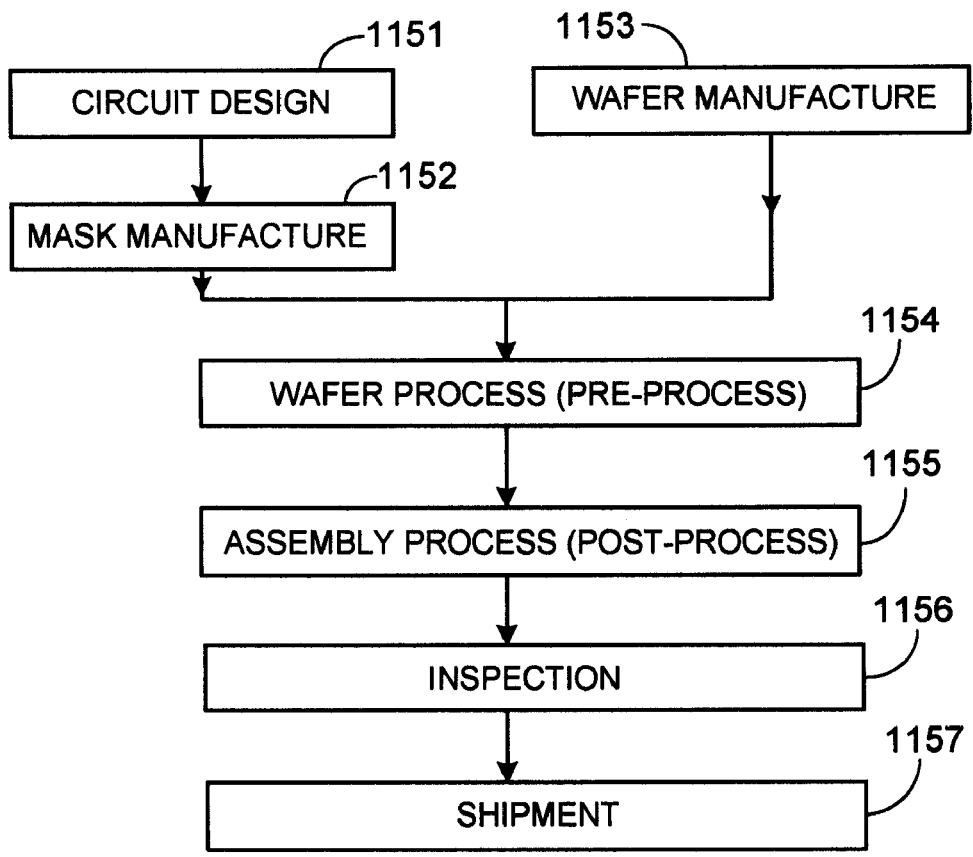
FIG. 5A and FIG. 5B are flow charts that describe steps for making integrated circuits.

As is well known in the art, lithography is a critical part of manufacturing methods for making semiconducting devices. For example, U.S. Pat. No. 5,483,343 outlines steps for such manufacturing methods. These steps are described below with reference to FIGS. 5A and 5B. FIG. 5A is a flow chart of the sequence of manufacturing a semiconductor device such as a semiconductor chip (e.g., IC or LSI), a liquid crystal panel or a CCD. Step 1151 is a design process for designing the circuit of a semiconductor device. Step 1152 is a process for manufacturing a mask on the basis of the circuit pattern design. Step 1153 is a process for manufacturing a wafer by using a material such as silicon.

Step 1154 is a wafer process which is called a pre-process wherein, by using the so prepared mask and wafer, circuits are formed on the wafer through lithography. To form circuits on the wafer that correspond with sufficient spatial resolution those patterns on the mask, interferometric positioning of the lithography tool relative the wafer is necessary. The interferometry methods and systems described herein can be especially useful to improve the effectiveness of the lithography used in the wafer process.

Step 1155 is an assembling step, which is called a post-process wherein the wafer processed by step 1154 is formed into semiconductor chips. This step includes assembling (dicing and bonding) and packaging (chip sealing). Step 1156 is an inspection step wherein operability check, durability check and so on of the semiconductor devices produced by step 1155 are carried out. With these processes, semiconductor devices are finished and they are shipped (step 1157).

Figure 5B:
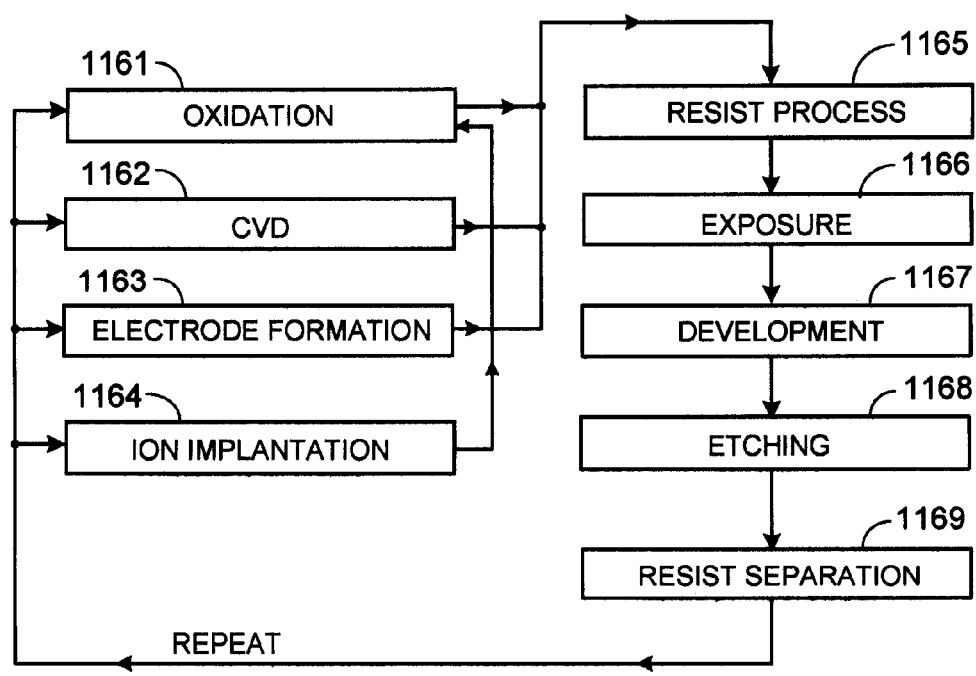

FIG. 5B is a flow chart showing details of the wafer process. Step 1161 is an oxidation process for oxidizing the surface of a wafer. Step 1162 is a CVD process for forming an insulating film on the wafer surface. Step 1163 is an electrode forming process for forming electrodes on the wafer by vapor deposition. Step 1164 is an ion implanting process for implanting ions to the wafer. Step 1165 is a resist process for applying a resist (photosensitive material) to the wafer. Step 1166 is an exposure process for printing, by exposure (i.e., lithography), the circuit pattern of the mask on the wafer through the exposure apparatus described above. Once again, as described above, the use of the interferometry systems and methods described herein improve the accuracy and resolution of such lithography steps.

Step 1167 is a developing process for developing the exposed wafer. Step 1168 is an etching process for removing portions other than the developed resist image. Step 1169 is a resist separation process for separating the resist material remaining on the wafer after being subjected to the etching process. By repeating these processes, circuit patterns are formed and superimposed on the wafer.

The interferometry systems described above can also be used in other applications in which the relative position of an object needs to be measured precisely. For example, in applications in which a write beam such as a laser, x-ray, ion, or electron beam, marks a pattern onto a substrate as either the substrate or beam moves, the interferometry systems can be used to measure the relative movement between the substrate and write beam.

Figure 6:
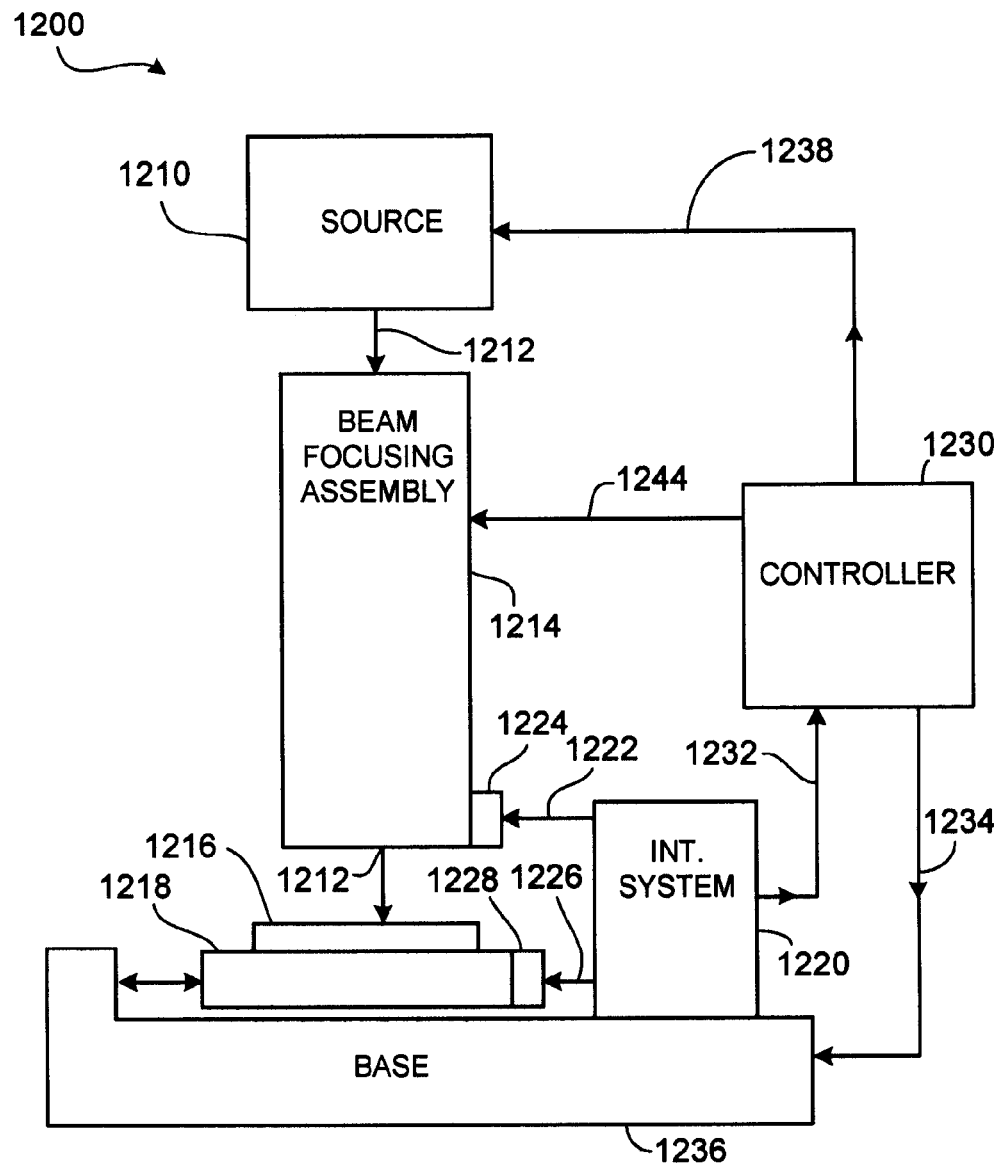
FIG. 6 is a schematic of a beam writing system that includes a distance measuring interferometry system.

As an example, a schematic of a beam writing system 1200 is shown in FIG. 6. A source 1210 generates a write beam 1212, and a beam focusing assembly 1214 directs the radiation beam to a substrate 1216 supported by a movable stage 1218. To determine the relative position of the stage, an interferometry system 1220 directs a reference beam 1222 to a mirror 1224 mounted on beam focusing assembly 1214 and a measurement beam 1226 to a mirror 1228 mounted on stage 1218. Since the reference beam contacts a mirror mounted on the beam focusing assembly, the beam writing system is an example of a system that uses a column reference. Interferometry system 1220 can be any of the interferometry systems described previously. Changes in the position measured by the interferometry system correspond to changes in the relative position of write beam 1212 on substrate 1216. Interferometry system 1220 sends a measurement signal 1232 to controller 1230 that is indicative of the relative position of write beam 1212 on substrate 1216. Controller 1230 sends an output signal 1234 to a base 1236 that supports and positions stage 1218. In addition, controller 1230 sends a signal 1238 to source 1210 to vary the intensity of, or block, write beam 1212 so that the write beam contacts the substrate with an intensity sufficient to cause photophysical or photochemical change only at selected positions of the substrate.

Furthermore, in some embodiments, controller 1230 can cause beam focusing assembly 1214 to scan the write beam over a region of the substrate, e.g., using signal 1244. As a result, controller 1230 directs the other components of the system to pattern the substrate. The patterning is typically based on an electronic design pattern stored in the controller. In some applications the write beam patterns a resist coated on the substrate and in other applications the write beam directly patterns, e.g., etches, the substrate.

An important application of such a system is the fabrication of masks and reticles used in the lithography methods described previously. For example, to fabricate a lithography mask an electron beam can be used to pattern a chromium-coated glass substrate. In such cases where the write beam is an electron beam, the beam writing system encloses the electron beam path in a vacuum. Also, in cases where the write beam is, e.g., an electron or ion beam, the beam focusing assembly includes electric field generators such as quadrapole lenses for focusing and directing the charged particles onto the substrate under vacuum. In other cases where the write beam is a radiation beam, e.g., x-ray, V, or visible radiation, the beam focusing assembly includes corresponding optics and for focusing and directing the radiation to the substrate.

It will be understood that various modifications may be made without departing from the spirit and scope of the invention. For example, the deformable part can be made from other plastically deformable materials, such as a glass. The deformable region may be heated above a glass transition temperature during alignment to allow the part to be more easily deformed. Accordingly, other embodiments are within the scope of the following claims.

What is claimed is:

1. An apparatus comprising:
    a first portion defining an optical axis and configured to connect to an optical fiber;
    a second portion having a reference surface configured to connect with a terminal; and
    a third portion between the first and second portions, wherein the third portion bends more easily than either the first or second portion to permit adjustable alignment of the optical axis relative to the reference surface; and
    wherein the third portion comprises a cylindrical region having walls that are thinnest in a center portion of the cylindrical region.

2. The apparatus of claim 1, wherein the walls define a light passage between the first and second portions.

3. The apparatus of claim 2, wherein the third portion is configured to bend to adjust the alignment of the optical axis relative to the reference surface without blocking the light passage between the first and second portions.

4. The apparatus of claim 1, wherein the third portion is configured to bend over a range of about 10 milliradians or less without fracturing to adjust the alignment of the optical axis relative to the reference surface.

5. The apparatus of claim 1, wherein the third portion is configured so that the alignment of the optical axis relative to the reference surface can be adjusted by about 200 microradians or more.

6. The apparatus of claim 5 wherein the third portion is configured so that the alignment of the optical axis relative to the reference surface can be adjusted by about one milliradian or more.

7. The apparatus of claim 1, wherein the third portion is configured so that the alignment of the optical axis relative to the reference surface can be adjusted by an amount that reduces insertion loss by about 0.1 dB or more.

8. The apparatus of claim 7 wherein the third portion is configured so that the alignment of the optical axis relative to the reference surface can be adjusted by an amount that reduces insertion loss by about 0.5 dB or more.

9. The apparatus of claim 1, wherein the third portion is bent from its initially manufactured shape.

10. The apparatus of claim 1, wherein the third portion has a yield point of about 80,000 psi or lower.

11. The apparatus of claim 10, wherein the third portion has a yield point of about 40,000 psi or lower.

12. The apparatus of claim 1, further comprising:
    a focusing element housed in the first portion, the focusing element being configured to couple light between the optical fiber and the terminal.

13. The apparatus of claim 12, wherein the focusing element comprises a lens.

14. The apparatus of claim 13, wherein the first portion is configured to move over a housing configured to house a ferrule surrounding an end of the optical fiber.

15. The apparatus of claim 14, wherein the first portion and the housing consist essentially of materials that have similar thermo-mechanical properties to the focusing element.

16. The apparatus of claim 1, wherein the reference surface is flat to within about 0.000006 inches or less across its diameter.

17. The apparatus of claim 1, wherein the second portion includes a polarization keyway.

18. The apparatus of claim 1, wherein the second portion includes a centering ball.

19. The apparatus of claim 1, wherein the terminal is coupled to a light source.

20. The apparatus of claim 1, wherein the terminal is coupled to an optical receiver.

21. The apparatus of claim 1, wherein the terminal is coupled to a second optical fiber.

22. The apparatus of claim 1, wherein the third portion includes one or more metals.

23. The apparatus of claim 22, wherein the third portion consists essentially of stainless steel.

24. The apparatus of claim 22, wherein the third portion is welded to the second portion.

25. The apparatus of claim 1, wherein the third portion consists essentially of one or more metals.

26. The apparatus of claim 25, wherein the third portion is annealed to soften the thinnest portion of the cylindrical region.

27. The apparatus of claim 26, wherein the thinnest portion of the cylindrical region is soft enough to be plastically deformed beyond its yield point to allow about 200 microradians or more of angular alignment variation of the optical axis relative to the reference surface.

28. The apparatus of claim 27, wherein the thinnest portion of the cylindrical region is soft enough to be plastically deformed beyond its yield point to allow about one milliradian or more of angular alignment variation of the optical axis relative to the reference surface.

29. A system comprising:
    a laser cavity; and
    an output terminal including the apparatus of claim 1, for coupling light from the laser cavity to an optical fiber.

30. The system of claim 29, wherein the laser is configured to operate at a visible wavelength.

31. An interferometry system comprising:
    a laser system that provides at least one source beam;
    a delivery system that collects the source beam from the laser system over optical fiber using at least one apparatus of claim 1, and provides an input beam; and
    an interferometer which during operation directs the input beam along different paths and provides an interference signal based on the input beam, wherein the interference signal is indicative of changes in an optical path difference between the different paths.

32. A lithography system for use in fabricating integrated circuits on a wafer, the system comprising:
- a stage for supporting the wafer;
- an illumination system for imaging spatially patterned radiation onto the wafer;
- a positioning system for adjusting the position of the stage relative to the imaged radiation; and
- the interferometry system of claim 31 for monitoring the position of the wafer relative to the imaged radiation.

33. A lithography system for use in fabricating integrated circuits on a wafer, the system comprising:
- a stage for supporting the wafer; and
- an illumination system including a radiation source, a mask, a positioning system, a lens assembly, and the interferometry system of claim 31,
- wherein during operation the source directs radiation through the mask to produce spatially patterned radiation, the positioning system adjusts the position of the mask relative to the radiation from the source, the lens assembly images the spatially patterned radiation onto the wafer, and the interferometry system monitors the position of the mask relative to the radiation from the source.

34. A beam writing system for use in fabricating a lithography mask, the system comprising:
- a source providing a write beam to pattern a substrate;
- a stage supporting the substrate;
- a beam directing assembly for delivering the write beam to the substrate;
- a positioning system for positioning the stage and beam directing assembly relative one another; and
- the interferometry system of claim 31 for monitoring the position of the stage relative to the beam directing assembly.

35. The apparatus of claim 1, wherein the reference surface is configured to mechanically register to the terminal.

* * * * *